US012228201B2

(12) United States Patent
Wang et al.

(10) Patent No.: US 12,228,201 B2
(45) Date of Patent: Feb. 18, 2025

(54) OVERLOAD IMPACT-RESISTANT PLANETARY REDUCER, ROBOT JOINT, AND QUADRUPED ROBOT

(71) Applicant: HangZhou YuShu TECHNOLOGY CO.,LTD., Hangzhou (CN)

(72) Inventors: Xingxing Wang, Hangzhou (CN); Zhiyu Yang, Hangzhou (CN)

(73) Assignee: HANGZHOU YUSHU TECHNOLOGY CO., LTD., Hangzhou (CN)

( * ) Notice: Subject to any disclaimer, the term of this patent is extended or adjusted under 35 U.S.C. 154(b) by 0 days.

(21) Appl. No.: 18/269,430

(22) PCT Filed: Nov. 30, 2021

(86) PCT No.: PCT/CN2021/134227
§ 371 (c)(1),
(2) Date: Jun. 23, 2023

(87) PCT Pub. No.: WO2022/135078
PCT Pub. Date: Jun. 30, 2022

(65) Prior Publication Data
US 2024/0133454 A1 Apr. 25, 2024
US 2024/0229909 A9 Jul. 11, 2024

(30) Foreign Application Priority Data
Dec. 25, 2020 (CN) .......................... 202011560498.9

(51) Int. Cl.
F16H 55/14 (2006.01)
B25J 9/10 (2006.01)
(Continued)

(52) U.S. Cl.
CPC .............. *F16H 55/14* (2013.01); *B25J 9/102* (2013.01); *F16H 55/17* (2013.01); *F16H 57/08* (2013.01);
(Continued)

(58) Field of Classification Search
CPC .... F16H 55/14; F16H 57/08; F16H 2057/085; F16H 1/28; F16H 2055/185; B25J 9/102
See application file for complete search history.

(56) References Cited

U.S. PATENT DOCUMENTS

2004/0248695 A1* 12/2004 Wang ...................... F16H 55/18
475/331

FOREIGN PATENT DOCUMENTS

CN 111288125 A * 6/2020
EP 3379106 A1 * 9/2018 ............. F03D 15/00
(Continued)

*Primary Examiner* — Bobby Rushing, Jr.
(74) *Attorney, Agent, or Firm* — Muncy, Geissler, Olds & Lowe, P.C.

(57) ABSTRACT

The present application discloses an overload impact-resistant planetary reducer, including a tooth face portion made of a rigid material and a buffer portion capable of being elastically deformed. The buffer portion is made of a material having certain rigidity and capable of being elastically deformed under an impact force, and is coaxially nested with the tooth face portion to form a reducer component capable of preventing overload impact. The planetary reducer is capable of being elastically deformed under the impact force, effectively absorbing energy during overload impact, thus protecting transmission parts such as gears. The structure is simple and practical. The present application further discloses an overload impact-resistant planetary reducer, a robot joint and a quadruped robot.

7 Claims, 4 Drawing Sheets

(51) Int. Cl.
*F16H 55/17* (2006.01)
*F16H 57/08* (2006.01)

(52) U.S. Cl.
CPC .. *F16H 2055/176* (2013.01); *F16H 2057/085* (2013.01)

(56) References Cited

FOREIGN PATENT DOCUMENTS

| | | | | | |
|---|---|---|---|---|---|
| EP | 3565983 | B1 | * | 3/2021 | ............... F16C 19/26 |
| JP | H04183971 | A | * | 6/1992 | ............ F16H 1/2863 |
| WO | WO-2021019030 | A1 | * | 2/2021 | ................ F02C 7/36 |

* cited by examiner

OVERLOAD IMPACT-RESISTANT PLANETARY REDUCER, ROBOT JOINT, AND QUADRUPED ROBOT

TECHNICAL FIELD

The present application relates to an overload impact-resistant planetary reducer, a robot joint, and a quadruped robot, belonging to the technical field of planetary reducers, robot joints and quadruped robots.

BACKGROUND

At present, legged robots inevitably fall or are hit by other objects in the external environment during walking. When these situations occur, the external impact will be transmitted to the inside of the robot joint, causing overload impact to transmission components such as gears inside the joint, resulting in structural damage and leading to the situation that the robot cannot work properly. Therefore, an overload impact protection structure is needed to absorb energy during overload impact, thus protecting transmission components such as gears.

Chinese patent CN109591045A has disclosed a robot joint unit with high degree-of-integrity and high performance, which includes a motor assembly driving a joint to move, and a reducer assembly. The motor assembly includes a motor rotor used for outputting a torque, and a motor base. The reducer assembly is provided with a gear ring. The gear ring butts against the motor base under the action of a frictional force generator.

In a case that the torque transmitted from the output end of the motor rotor or reducer assembly to the gear ring is greater than the frictional torque between the gear ring and the motor base, the gear ring of the reducer assembly will be driven by the output end of the motor rotor or reducer assembly to overcome the frictional torque generated by the frictional force generator, causing the gear ring to rotate relative to the motor base, achieving frictional slipping between the reducer assembly and the motor base, limiting the torque borne by the reducer assembly, and thus preventing the reducer from being damaged due to the large torque from the motor or the output end of the joint unit.

SUMMARY

Technical Problem

However, the above solution requires additionally providing a frictional force generator, thus requiring a large number of components and causing high manufacturing cost. In addition, it is necessary to reserve assembly space for the frictional force generator, which causes the volume of the reducer and the robot to be large, thus not achieving compactness.

Solution to the Problem

Technical Solution

Aiming at overcoming the shortcomings of the existing technology, a first purpose of the present application is to provide an overload impact-resistant planetary reducer including a tooth face portion made of a rigid material and a buffer portion capable of being elastically deformed to form a reducer component capable of preventing overload impact, which is capable of being elastically deformed under an impact force, thus effectively absorbing energy during overload impact and protecting transmission components such as gears. In addition, the number of parts required is small, the manufacturing cost is low, the occupied space is small and the structure is compact.

A second purpose of the present application is to provide an overload impact-resistant robot joint including a tooth face portion made of a rigid material and a buffer portion capable of being elastically deformed to form a reducer component capable of preventing overload impact, which is capable of being elastically deformed under an impact force, thus effectively absorbing energy during overload impact and protecting transmission components such as gears. In addition, the number of parts required is small, the manufacturing cost is low, the occupied space is small and the structure is compact.

A third purpose of the present application is to provide an overload impact-resistant quadruped robot including a tooth face portion made of a rigid material and a buffer portion capable of being elastically deformed to form a reducer component capable of preventing overload impact, which is capable of being elastically deformed under an impact force, thus effectively absorbing energy during overload impact and protecting transmission components such as gears. In addition, the number of parts required is small, the manufacturing cost is low, the occupied space is small and the structure is compact.

In order to achieve one of the purposes, the present application adopts the following first technical solution:
An overload impact-resistant planetary reducer, wherein the overload impact-resistant planetary reducer includes a tooth face portion made of a rigid material and a buffer portion capable of being elastically deformed;
the buffer portion is made of a material having certain rigidity and capable of being elastically deformed under an impact force, and is coaxially nested with the tooth face portion to form a reducer component capable of preventing overload impact.

Through continuous exploration and experimentation, in the present application, a tooth face portion made of a rigid material and a buffer portion capable of being elastically deformed are provided to form a reducer component capable of preventing overload impact, which is capable of being elastically deformed under an impact force, thus effectively absorbing energy during overload impact and protecting transmission components such as gears.

Compared with the existing overload impact-resistant impact structure, the number of parts required is smaller, the manufacturing cost is lower, the occupied space is smaller, the structure is more compact, simple and practical, and the solution is feasible.

As an exemplary technical measure,
the reducer component is a planetary gear;
the tooth face portion is an outer tooth portion of the planetary gear;
the buffer portion is a buffer layer assembled on an inner side of the outer
tooth portion;
in a case that the outer tooth portion is subjected to an impact force, the buffer layer generates deformation, causing the outer tooth portion to displace relative to the planetary gear shaft;
in a case that the impact force on the outer tooth portion disappears, the deformation of the buffer layer disappears, causing the outer tooth portion to reset relative to the planetary gear shaft. The structure is simple and practical, and the manufacturing is facilitated.

As an exemplary technical measure,
the buffer layer is provided with at least one deformation through hole capable of being deformed by the impact force;
the deformation through hole is capable of generating elastic deformation in a case of being subjected to the impact force, so as to further improve the overload impact resistance.

As an exemplary technical measure,
the buffer layer is nested on an inner ring side or outer ring side of a bearing between the planetary gear and the planetary gear shaft.

As an exemplary technical measure,
the buffer layer includes but not limited to rubber, silica gel, plastic and polyurethane, which may be reasonably selected by those skilled in the art according to the actual situation.

As an exemplary technical measure,
the reducer component is a gear ring;
the tooth face portion is an inner tooth layer of the gear ring;
the buffer portion is a buffer ring assembled on an outer side of the inner
tooth layer;
in a case that the inner tooth layer is subjected to the impact force, the buffer ring generates tangential deformation, causing the inner tooth layer to displace;
in a case that the impact force on the inner tooth layer disappears, the deformation of the buffer ring disappears, causing the inner tooth layer to reset. The structure is simple and practical, and the manufacturing is facilitated.

As an exemplary technical measure,
the buffer ring is provided with at least one deformation through hole capable of being deformed by the impact force;
the deformation through hole is capable of generating elastic deformation in a case of being subjected to the impact force, so as to improve the overload impact resistance.

As an exemplary technical measure,
the buffer ring includes but not limited to rubber, silica gel, plastic and polyurethane.

In order to achieve one of the purposes, the present application adopts the following second technical solution:
An overload impact-resistant planetary reducer, wherein the overload impact-resistant planetary reducer includes a tooth face portion made of a rigid material and a buffer portion capable of being elastically deformed;
the buffer portion is nested with the tooth face portion to form a reducer component capable of preventing overload impact.

Through continuous exploration and experimentation, in the present application, a tooth face portion made of a rigid material and a buffer portion capable of being elastically deformed are provided, and the buffer portion is capable of being elastically deformed under an impact force, thus effectively absorbing energy during overload impact and protecting transmission components such as gears.

Compared with the existing overload impact-resistant impact structure, the number of parts required is smaller, the manufacturing cost is lower, the occupied space is smaller, the structure is more compact, simple and practical, and the solution is feasible.

In order to achieve one of the purposes, the present application adopts the following third technical solution:
A robot joint, wherein
the robot joint includes the overload impact-resistant planetary reducer and a motor, and an output shaft of the motor is fixedly connected with a sun gear of the planetary reducer.

Through continuous exploration and experimentation, in the present application, a tooth face portion made of a rigid material and a buffer portion capable of being elastically deformed are provided to form a reducer component capable of preventing overload impact, which is capable of being elastically deformed under an impact force, thus effectively absorbing energy during overload impact and protecting transmission components such as gears.

Compared with the existing overload impact-resistant impact structure, the number of parts required is smaller, the manufacturing cost is lower, the occupied space is smaller, the structure is more compact, simple and practical, and the solution is feasible.

In order to achieve one of the purposes, the present application adopts the following fourth technical solution:
A quadruped robot, wherein the quadruped robot includes the overload impact-resistant planetary reducer.

Through continuous exploration and experimentation, in the present application, a tooth face portion made of a rigid material and a buffer portion capable of being elastically deformed are provided to form a reducer component capable of preventing overload impact, which is capable of being elastically deformed under an impact force, thus effectively absorbing energy during overload impact and protecting transmission components such as gears.

Compared with the existing overload impact-resistant impact structure, the number of parts required is smaller, the manufacturing cost is lower, the occupied space is smaller, the structure is more compact, simple and practical, and the solution is feasible.

Beneficial Effects of the Present Application

Beneficial Effect

Through continuous exploration and experimentation, in the present application, a tooth face portion made of a rigid material and a buffer portion capable of being elastically deformed are provided to form a reducer component capable of preventing overload impact, which is capable of being elastically deformed under an impact force, thus effectively absorbing energy during overload impact and protecting transmission components such as gears.

Compared with the existing overload impact-resistant impact structure, the number of parts required is smaller, the manufacturing cost is lower, the occupied space is smaller, the structure is more compact, simple and practical, and the solution is feasible.

BRIEF DESCRIPTION OF THE DRAWINGS

Description of the Drawings

Figure 1:
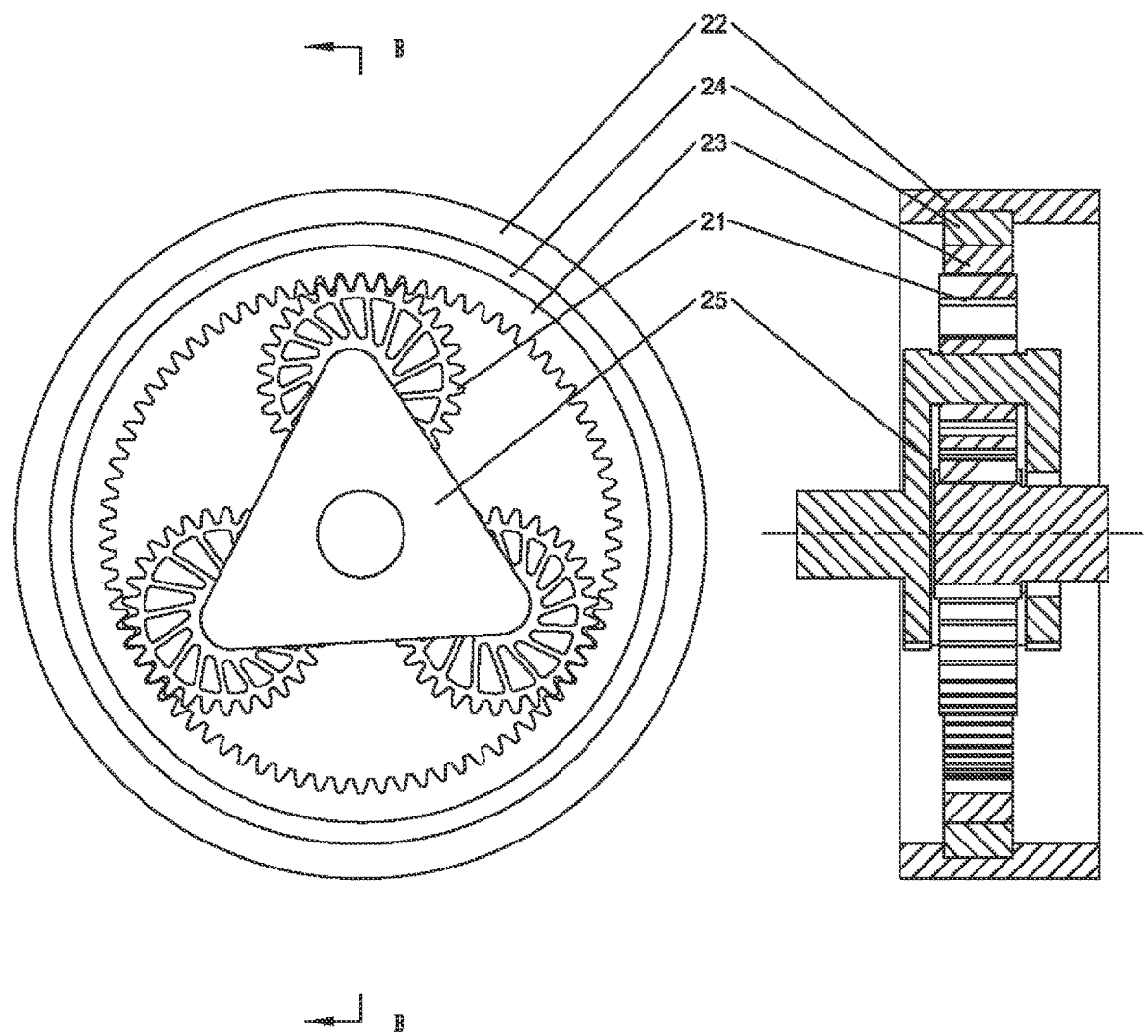

FIG. 1 illustrates an all sectional view of a planetary reducer according to the present application.

Figure 2:
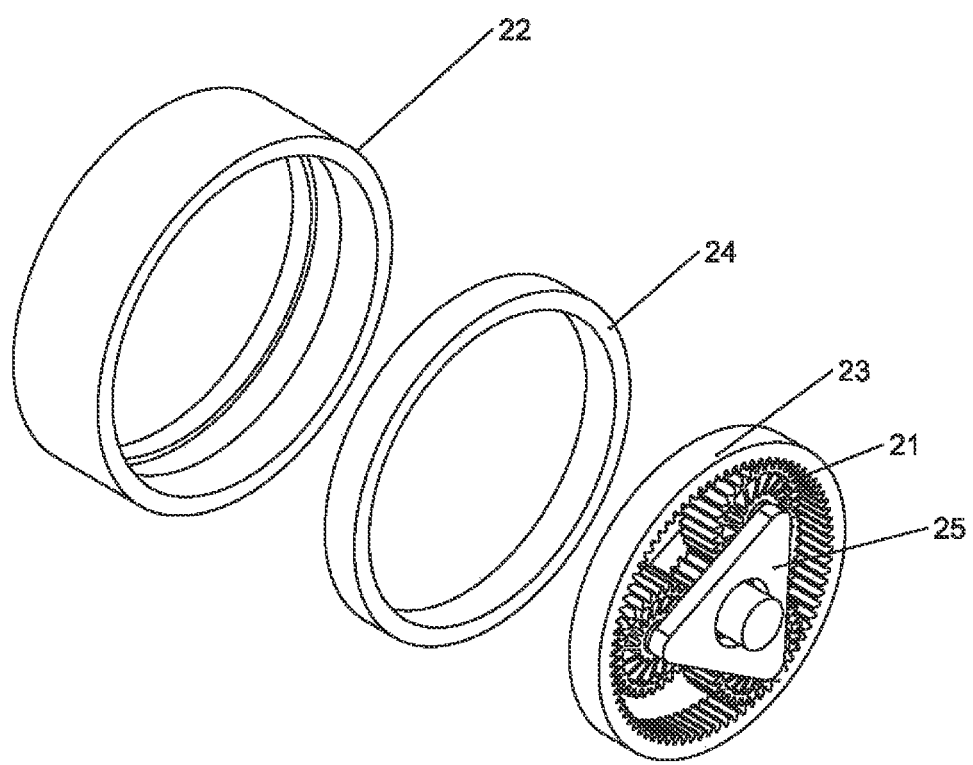

FIG. 2 illustrates an exploded view of a planetary reducer according to the present application.

Figure 3:
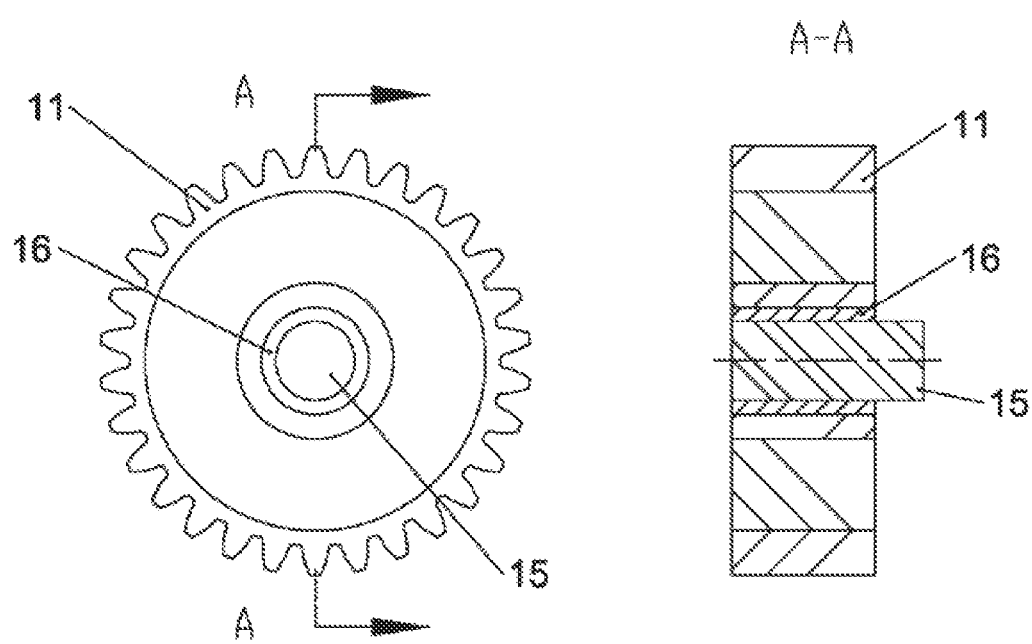

FIG. 3 illustrates a structural schematic diagram of a planetary reducer according to a first embodiment of the present application.

Figure 4:
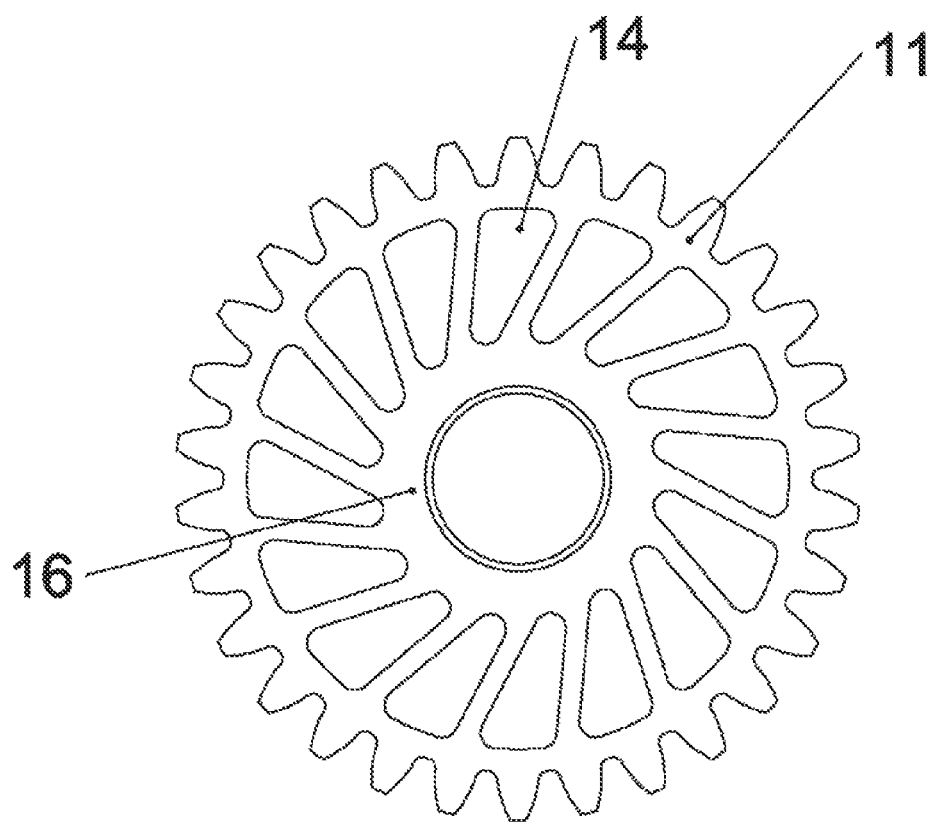

FIG. 4 illustrates a structural schematic diagram of a planetary reducer according to a second embodiment of the present application.

In the drawings, 11—outer tooth portion; 14—deformation through hole; 15—planetary gear shaft; 16—buffer layer; 21—planetary gear; 22—outer layer portion; 23—inner tooth layer; 24—buffer ring; 25—planet carrier.

DETAILED DESCRIPTION OF THE EMBODIMENTS

Description of the Embodiments

In order to enable the purposes, technical solutions and advantages of the present application to be more clearly understood, the present application will be further described below in combination with the specific embodiments with reference to the drawings. It is to be understood that the specific embodiments described here are only used for describing the present application, instead of limiting the present application.

On the contrary, the present application covers any substitutions, modifications, equivalent methods, and solutions defined by the claims in the essence and scope of the present application. Further, in order to provide the public with a better understanding of the present application, specific details are described in detail in the following description of the present application. For those skilled in the art, without the description of these detailed parts, the present application can be fully understood.

Referring to FIG. 1-4, a robot joint having a dynamic sealing structure is provided.

The robot joint having the dynamic sealing structure includes a power unit housing and an output shaft rotatable relative to the power unit housing.

The buffer portion is made of a material having certain rigidity and capable of being elastically deformed under an impact force, and is coaxially nested with the tooth face portion to form a reducer component capable of preventing overload impact.

Through continuous exploration and experimentation, in the present application, a tooth face portion made of a rigid material and a buffer portion capable of being elastically deformed are provided to form a reducer component capable of preventing overload impact, which is capable of being elastically deformed under an impact force, thus effectively absorbing energy during overload impact and protecting transmission components such as gears.

Compared with the existing overload impact-resistant impact structure, the number of parts required is smaller, the manufacturing cost is lower, the occupied space is smaller, the structure is more compact, simple and practical, and the solution is feasible.

Specific Embodiment of Reducer Component According to the Present Application

The reducer component is a planetary gear 21.

The tooth face portion is an outer tooth portion 11 of the planetary gear 21. The buffer portion is a buffer layer 16 assembled on an inner side of the outer tooth portion 11.

In a case that the outer tooth portion 11 is subjected to an impact force, the buffer layer 16 generates deformation, causing the outer tooth portion 11 to displace relative to the planetary gear shaft 15.

In a case that the impact force on the outer tooth portion 11 disappears, the deformation of the buffer layer 16 disappears, causing the outer tooth portion 11 to reset relative to the planetary gear shaft. The structure is simple and practical, and the manufacturing is facilitated.

Specific Embodiment of Deformation Through Hole 14 Provided in Buffer Layer 16 According to the Present Application The buffer layer 16 is provided with at least one deformation through hole 14 capable of being deformed by the impact force.

The deformation through hole 14 is capable of generating elastic deformation in a case of being subjected to the impact force, so as to further improve the overload impact resistance.

Specific Embodiment of Assembling Position of Buffer Layer 16 According to the Present Application The buffer layer 16 is nested on an inner ring side or outer ring side of a bearing between the planetary gear 21 and the planetary gear shaft 15.

The planetary gear shaft 15 is a single-shaft structure or planet carrier 25, which may be selected by those skilled in the art according to the actual situation.

Specific Embodiment of Material Selection of Buffer Layer 16 According to the Present Application The buffer layer 16 includes but not limited to rubber, silica gel, plastic and polyurethane, which may be reasonably selected by those skilled in the art according to the actual situation.

Specific Embodiment of Additionally Provided Inner Ring Portion According to the Present Application An inner ring portion with a shaft hole is assembled on one side of the buffer layer 16 far away from the outer tooth portion 11.

The inner ring portion is made of a rigid material.

In a case that the outer tooth portion 11 is subjected to an overload impact, the buffer layer 16 generates deformation, causing the outer tooth portion 11 and the inner ring portion to rotate and/or displace relative to each other.

In a case that the overload impact on the outer tooth portion 11 disappears, the deformation of the buffer layer 16 disappears, causing the outer tooth portion 11 and the inner ring portion to reset and return to positions before relative rotation and/or displacement.

The rigidity of the outer tooth portion 11 and the inner ring portion is greater than the rigidity of the buffer layer 16.

The buffer layer 16 is respectively screwed, bonded or clamped with the outer tooth portion 11 and the inner ring portion.

The outer tooth portion 11 and the inner ring portion are made of forged steel, cast steel, or cast iron.

The buffer layer 16 is made of polyurethane.

Another Specific Embodiment of Reducer Component According to the Present Application The reducer component is a gear ring.

The tooth face portion is an inner tooth layer 23 of the gear ring.

The buffer portion is a buffer ring 24 assembled on an outer side of the inner tooth layer 23.

In a case that the inner tooth layer 23 is subjected to the impact force, the buffer ring 24 generates tangential deformation, causing the inner tooth layer to displace.

In a case that the impact force on the inner tooth layer 23 disappears, the deformation of the buffer ring 24 disappears, causing the inner tooth layer 23 to reset. The structure is simple and practical, and the manufacturing is facilitated.

Specific Embodiment of Deformation Through Hole 14 Provided in Buffer Ring 24 According to the Present Application The buffer ring 24 is provided with at least one deformation through hole 14 capable of being deformed by the impact force.

The deformation through hole 14 is capable of generating elastic deformation in a case of being subjected to the impact force, so as to improve the overload impact resistance.

Specific Embodiment of Material Selection of Buffer Ring 24 According to the Present Application The buffer ring 24 includes but not limited to rubber, silica gel, plastic and polyurethane.

Specific Embodiment of Additionally Provided Outer Layer Portion 22 According to the Present Application An outer layer portion 22 is assembled on one side of the buffer ring 24 far away from the inner tooth layer 23.

The outer layer portion 22 is made of a rigid material.

In a case that the inner tooth layer 23 is subjected to an overload impact, the buffer ring 24 generates deformation, causing the inner tooth layer 23 to rotate relative to the outer layer portion 22.

In a case that the overload impact on the inner tooth layer 23 disappears, the deformation of the buffer ring 24 disappears, causing the inner tooth layer 23 and the outer layer portion 22 to reset and return to relative positions before relative rotation.

The rigidity of the outer layer portion 22 and the inner tooth layer 23 is greater than the rigidity of the buffer ring 24.

The buffer ring 24 is respectively screwed, bonded or clamped with the outer layer portion 22 and the inner tooth layer 23.

The outer layer portion 22 and the inner tooth layer 23 are made of forged steel, cast steel, or cast iron, The buffer ring 24 is made of polyurethane.

Specific Embodiment of Application of Planetary Reducer According to the Present Application A robot joint is provided.

The robot joint includes the overload impact-resistant planetary reducer and a motor. An output shaft of the motor is fixedly connected with a sun gear of the planetary reducer.

Through continuous exploration and experimentation, in the present application, a tooth face portion made of a rigid material and a buffer portion capable of being elastically deformed are provided to form a reducer component capable of preventing overload impact, which is capable of being elastically deformed under an impact force, thus effectively absorbing energy during overload impact and protecting transmission components such as gears.

Compared with the existing overload impact-resistant impact structure, the number of parts required is smaller, the manufacturing cost is lower, the occupied space is smaller, the structure is more compact, simple and practical, and the solution is feasible.

Another Specific Embodiment of Application of Planetary Reducer According to the Present Application A quadruped robot includes the overload impact-resistant planetary reducer.

Through continuous exploration and experimentation, in the present application, a tooth face portion made of a rigid material and a buffer portion capable of being elastically deformed are provided to form a reducer component capable of preventing overload impact, which is capable of being elastically deformed under an impact force, thus effectively absorbing energy during overload impact and protecting transmission components such as gears.

Compared with the existing overload impact-resistant impact structure, the number of parts required is smaller, the manufacturing cost is lower, the occupied space is smaller, the structure is more compact, simple and practical, and the solution is feasible.

The above embodiments are only exemplary embodiments of the present application and are not intended to limit the present application. Any modifications, equivalent replacements and improvements made within the essence and rule of the present application fall within the scope of protection of the present application.

The invention claimed is:

1. An overload impact-resistant planetary reducer, comprising a tooth face portion and a buffer portion;
   the reducer component is a planetary gear;
   the tooth face portion is an outer tooth portion of the planetary gear;
   the buffer portion is a buffer layer assembled on an inner side of the outer tooth portion; in a case that the outer tooth portion is subjected to an impact force, the buffer layer generates deformation, causing the outer tooth portion to displace relative to a planetary gear shaft;
   in a case that the impact force on the outer tooth portion disappears, the deformation of the buffer layer disappears, causing the outer tooth portion to reset relative to the planetary gear shaft;
   the buffer layer is provided with a plurality of deformation through holes capable of being deformed by the impact force;
   each of the plurality of deformation through holes has a triangular shape having a base side extending in a circumferential direction of the planetary gear and two sides extending from the base side towards a side of the planetary gear shaft, and
   a line extending through a center of the base side and a vertex formed by the two sides of the triangle shape is offset from a center of the planetary gear shaft.

2. The overload impact-resistant planetary reducer according to claim 1, wherein a first one of the two sides of the triangular shape is longer than a second one of the two sides of the triangular shape.

3. The overload impact-resistant planetary reducer according to claim 1, wherein the buffer layer is nested on an inner ring side or outer ring side of a bearing between the planetary gear and the planetary gear shaft.

4. The overload impact-resistant planetary reducer according to claim 3, wherein the buffer layer includes one of rubber, silica gel, plastic and polyurethane.

5. The overload impact-resistant planetary reducer according to claim 1, wherein the plurality of deformation through holes are provided in the buffer layer in a single layer in a circumferential direction of the planetary gear.

6. A robot joint, wherein the robot joint comprises the overload impact-resistant planetary reducer according to claim 1 and a motor, and an output shaft of the motor is fixedly connected with a sun gear of the planetary reducer.

7. A quadruped robot, wherein the quadruped robot comprises the overload impact-resistant planetary reducer according to claim 1.

* * * * *